United States Patent [19]

Jackman

[11] 4,163,807

[45] Aug. 7, 1979

[54] CITRUS FRUIT JUICE AND DRINK

[75] Inventor: Kristina R. Jackman, San Diego, Calif.

[73] Assignee: Merck & Co., Inc., Rahway, N.J.

[21] Appl. No.: 886,717

[22] Filed: Mar. 15, 1978

[51] Int. Cl.$^2$ .............................................. A23L 2/02
[52] U.S. Cl. .................................. 426/599; 426/330.5
[58] Field of Search ............... 426/599, 330.5, 573, 426/654

[56] References Cited

U.S. PATENT DOCUMENTS

| | | | |
|---|---|---|---|
| 1,955,849 | 4/1934 | Finley | 426/590 |
| 2,599,519 | 6/1952 | Stevens et al. | 426/590 |
| 2,764,486 | 9/1956 | Stevens et al. | 426/590 |
| 3,395,021 | 7/1968 | Glicksman | 426/590 |
| 3,446,625 | 5/1969 | Blethen | 426/590 |
| 4,046,925 | 9/1977 | Igoe | 426/599 |

FOREIGN PATENT DOCUMENTS 44-72579  9/1969  Japan ........................................ 426/599

*Primary Examiner*—Joseph M. Golian
*Assistant Examiner*—Elizabeth A. Hatcher
*Attorney, Agent, or Firm*—Gabriel Lopez; Julian S. Levitt; Donald J. Perrella

[57] ABSTRACT

Appearance, taste and stability of citrus fruit juices and drinks are improved by incorporating xanthan gum and CMC.

6 Claims, No Drawings

CITRUS FRUIT JUICE AND DRINK

BACKGROUND OF THE INVENTION

Suspended fruit pulp in citrus fruit juice and fruit drinks tends to settle on standing producing a nonhomogeneous product having a fruit solids floculate at the bottom and an opaque supernate or cloud. Attempts to maintain a more uniform product by adding a suspending and thickening agent such as CMC have been unsuccessful while adding a thickening agent such as xanthan gum results in cloud destabilization and pulp flocculation. Citrus juice solids in a reconstituted dry mix also flocculate and precipitate in the presence of xanthan gum which is used as a bodying agent.

OBJECTS OF THE INVENTION

It is, accordingly, an object of the present invention to improve the appearance, mouthfeel, taste and stability of acidic fruit juices and fruit drinks. Another object is to provide improved suspension of pulp in citrus fruit juice and fruit drinks. A further object is to provide fruit juices and fruit drinks having improved taste and mouth properties. These and other objects of the present invention will be apparent from the following description.

SUMMARY OF THE INVENTION

The appearance, taste, mouthfeel and stability of citrus fruit juices and citrus fruit drinks are improved by adding a small amount of both xanthan gum and sodium carboxymethyl cellulose (CMC).

DETAILED DESCRIPTION

It has now been found that improved citrus fruit juices and fruit drinks are obtained by incorporating into the fruit juice from about 0.01 to about 0.1 weight % of xanthan gum and from about 0.01 to about 0.14 weight % CMC.

The xanthan gum employed is food-grade xanthan gum while the CMC is food-grade CMC having a degree of substitution (DS) of at least about 0.7. In general lesser amounts of CMC having a higher DS can be used.

The appearance, taste and stability of fruit juice or of a fruit drink containing a citrus fruit juice or citrus fruit solids may be improved according to the present invention. Examples of citrus fruit whose juice or solids may be used are orange, grapefruit, tangerine, lemon lime and pineapple.

The xanthan gum and CMC may be added to whole fruit juice or citrus fruit drink, to citrus fruit juice or citrus fruit drink concentrate, to pasteurized citrus fruit juice, to reconstituted citrus fruit juice or citrus fruit drink or to dry mixes containing citrus fruit solids.

The following examples illustrate the present invention without, however, limiting the same thereto.

EXAMPLE 1

| | Formulation (grams) | | | |
|---|---|---|---|---|
| Ingredient | A | B | C | D |
| Xanthan gum | — | 0.40 | — | 0.40 |
| CMC | — | — | 0.80 | 0.80 |

The foregoing formulations are hydrated separately in about 800 ml of water to which 2.4 g. of citric acid is added, and preservatives if desired. Then 74.7 g. of 76° Brix invert sugar syrup and 103.2 g of 58° Brix frozen orange juice concentrate are added and the total volume is brought to one liter by addition of water. After standing for 24 hours the formulations appear as follows:

A nonuniform, pulp settling to bottom
B nonuniform, clear layer at top, pulp agglomerates formed
C nonuniform, pulp settling to bottom
D uniform, homogeneous

EXAMPLE 2

A series of orange juice drinks are prepared similar to formulation D of Example 1, but containing the following weight % of xanthan gum and CMC.

| Formulation | Xanthan Gum | CMC | Xanthan Gum: CMC ratio |
|---|---|---|---|
| E | 0 | 0 | |
| F | 0.02 | 0 | |
| G | 0.02 | 0.02 | 1:1 |
| H | 0.02 | 0.025 | 1:1.25 |
| I | 0.02 | 0.03 | 1:1.5 |
| J | 0.02 | 0.035 | 1:1.75 |
| K | 0.02 | 0.04 | 1:2 |
| L | 0.02 | 0.045 | 1:2.25 |

Equal volumes of the formulations are stored for 14 days at 2° C. in equal dimension containers and the clear supernatant layer which forms is measured and expressed as a % of the height of the juice drink, with the following results:

| | Supernatant Layer as % of Liquid Height | | | | |
|---|---|---|---|---|---|
| | Day | | | | |
| Formulation | 2 | 4 | 7 | 11 | 14 |
| E | 76 | 88 | 81 | 83 | 83 |
| F | 46 | 53 | 61 | 66 | 67 |
| G | 43 | 47 | 48 | 59 | 63 |
| H | 40 | 46 | 52 | 57 | 63 |
| I | 34 | 37 | 43 | 50 | 54 |
| J | 36 | 39 | 46 | — | 53 |
| K | 23 | 33 | 40 | 44 | 49 |
| L | 0 | 0 | 0 | 52 | 58 |

The foregoing data show that at low levels of xanthan gum, a level of CMC at least about twice that of the xanthan gum is required for stability.

EXAMPLE 3

Four lemon flavored drinks are prepared by adding the following ingredients to 1 liter of cold water and hand stirring for 30 seconds.

| | GRAMS | | | |
|---|---|---|---|---|
| | A | B | C | D |
| Sugar | 86.299 | 86.179 | 86.059 | 85.939 |
| Lemon juice powder | 8.0 | 8.0 | 8.0 | 8.0 |
| Citric acid | 2.8 | 2.8 | 2.8 | 2.8 |
| Monocalcium phosphate | 1.4 | 1.4 | 1.4 | 1.4 |
| Clouding agent | 0.75 | 0.75 | 0.75 | 0.75 |
| Lemon essence, encapsulated | 0.5 | 0.5 | 0.5 | 0.5 |
| Lemon oil, encapsulated | 0.25 | 0.25 | 0.25 | 0.25 |
| Coloring, FD&C yellow No. 5 | 0.001 | 0.001 | 0.001 | 0.001 |

-continued

|  | GRAMS | | | |
| --- | --- | --- | --- | --- |
|  | A | B | C | D |
| xanthan gum | — | 0.012 | — | 0.12 |
| CMC | — | — | 0.24 | 0.24 |
|  | 100.0 | 100.0 | 100.0 | 100.0 |

After storage for 16 hours at 2° C., the following results are observed:

A—homogeneous appearance, solids settled to bottom, watery body, unsatisfactory mouthfeel B—agglomerated solid particles settled to bottom, partial cloud destabilization, thicker body than A, satisfactory mouthfeel C—homogenous appearance, solids settled to bottom, watery body, mouthfeel better than A but poorer than B D—homogeneous appearance, least solids settled to bottom, thicker body than A, satisfactory mouthfeel.

What is claimed is:

1. A citrus fruit product containing fruit pulp consisting of citrus fruit juice or fruit drink containing a citrus fruit juice having incorporated therein a combination of gums consisting essentially of from about 0.01 to about 0.1 weight % of xanthan gum, and from about 0.01 to about 0.14 weight % of sodium carboxymethyl cellulose having a degree of substitution of at least about 0.7 wherein the weight % is based on the total weight of the citrus fruit product whereby the citrus fruit product has enhanced stability and homogenity and the fruit pulp remains substantially suspended on standing.

2. A citrus fruit product according to claim 1 containing from about 0.01 to about 0.06 weight % of xanthan gum.

3. A citrus fruit product according to claim 1 containing from about 0.02 to about 0.06 weight % of xanthan gum.

4. A citrus fruit product according to claim 2 containing from about 0.02 to about 0.14 weight % of sodium carboxymethyl cellulose.

5. A citrus fruit product according to claim 2 containing from about 0.04 to about 0.14 weight % of sodium carboxymethyl cellulose.

6. A citrus fruit product according to claim 3 containing from about 0.04 to about 0.14 weight % of sodium carboxymethyl cellulose.